(12) United States Patent
Hossbach et al.

(10) Patent No.: US 10,684,873 B2
(45) Date of Patent: Jun. 16, 2020

(54) EFFICIENT DATA DECODING USING RUNTIME SPECIALIZATION

(71) Applicant: Oracle International Corporation, Redwood Shores, CA (US)

(72) Inventors: Bastian Hossbach, Thalwil (CH); Jürgen Christ, Korntal-Münchingen (DE); Laurent Daynes, Grenoble (FR); Matthias Brantner, Sunnyvale, CA (US); Hassan Chafi, San Mateo, CA (US); Christian Humer, Zurich (CH)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/006,668

(22) Filed: Jun. 12, 2018

(65) Prior Publication Data

US 2019/0377589 A1    Dec. 12, 2019

(51) Int. Cl.
*G06F 9/455* (2018.01)
*G06F 16/245* (2019.01)
*G06F 16/38* (2019.01)

(52) U.S. Cl.
CPC ........ *G06F 9/45525* (2013.01); *G06F 16/245* (2019.01); *G06F 16/38* (2019.01)

(58) Field of Classification Search
CPC ..... G06F 9/45516–45525; G06F 16/245–2477
USPC ....................................................... 717/148
See application file for complete search history.

(56) References Cited

U.S. PATENT DOCUMENTS

| 7,168,063 | B2* | 1/2007 | Meijer | G06F 9/4492 717/116 |
| 7,171,424 | B2* | 1/2007 | Barsness | G06F 16/248 707/727 |
| 7,275,241 | B2* | 9/2007 | Choi | G06F 9/45516 717/142 |

(Continued)

FOREIGN PATENT DOCUMENTS

CN    106156353 A    11/2016

OTHER PUBLICATIONS

Karpathiotakis, M., et al., Adaptive Query Processing on RAW Data, Proceedings of the VLDB Endowment, Aug. 2014, pp. 1119-1130, [retrieved on Dec. 10, 2019], Retrieved from the Internet.*

(Continued)

*Primary Examiner* — Geoffrey R St Leger
(74) *Attorney, Agent, or Firm* — Hickman Palermo Becker Bingham LLP (57) ABSTRACT

Computer-implemented techniques described herein provide efficient data decoding using runtime specialization. In an embodiment, a method comprises a virtual machine executing a body of code of a dynamically typed language, wherein executing the body of code includes: querying a relational database, and in response to the query, receiving table metadata indicating data types of one or more columns of a first table in the relational database. In response to receiving the table metadata: for a first column of the one or more columns, generating decoding machine code to decode the first column based on the data type of the first column, and executing the decoding machine code to decode the first column of the one or more columns.

16 Claims, 6 Drawing Sheets

(56) References Cited

U.S. PATENT DOCUMENTS

| | | | | |
|---|---|---|---|---|
| 8,457,419 | B2* | 6/2013 | Lamb | H04N 19/60 341/63 |
| 8,700,579 | B2* | 4/2014 | Apanowicz | H03M 7/30 707/693 |
| 8,812,523 | B2* | 8/2014 | Marwah | G06F 16/24561 707/754 |
| 9,235,394 | B2* | 1/2016 | Inglis | G06F 9/45516 |
| 10,262,001 | B2* | 4/2019 | Faith | G06Q 30/06 |
| 2001/0056504 | A1* | 12/2001 | Kuznetsov | G06F 8/30 719/310 |
| 2005/0114848 | A1* | 5/2005 | Choi | G06F 9/45516 717/148 |
| 2005/0198011 | A1* | 9/2005 | Barsness | G06F 16/248 |
| 2008/0071818 | A1* | 3/2008 | Apanowicz | H03M 7/30 |
| 2008/0253668 | A1* | 10/2008 | Lamb | H04N 19/60 382/233 |
| 2012/0054725 | A1* | 3/2012 | Inglis | G06F 8/4443 717/148 |
| 2012/0078860 | A1* | 3/2012 | Roberts | G06F 16/24561 707/693 |
| 2013/0205282 | A1* | 8/2013 | Lafreniere | G06F 9/45504 717/139 |
| 2014/0095517 | A1* | 4/2014 | Marwah | G06F 16/24561 707/754 |
| 2017/0293652 | A1* | 10/2017 | Kevorkian | G06F 16/289 |
| 2018/0046623 | A1* | 2/2018 | Faith | G06Q 30/06 |
| 2019/0065552 | A1 | 2/2019 | Brantner | |

OTHER PUBLICATIONS

Slee et al., "Thrift: Scalable Cross-Language Services Implementation", Facebook, dated Apr. 1, 2007, 8 pages.

Raasveldt et al., "Don't Hold My Data Hostage: A Case for Client Protocol Redesign", Proc, VLDB Endow, dated Jun. 2017, 12 pages.

Li et al., "Mison: A Fast JSON Parser for Data Analytics", Proc VLDB Endow, dated Jun. 2017, 12 pages.

Bonetta et al.,"FAD.js: Fast JSON Data Access Using JITbased Speculative Optimizations", Proc VLDB Endow, dated Aug. 2017, 12 pages.

* cited by examiner

EFFICIENT DATA DECODING USING RUNTIME SPECIALIZATION

FIELD OF THE INVENTION

Embodiments relate generally to techniques for optimizing decoding operations.

BACKGROUND

When reading data from a relational database (e.g., the result set of a query), a driver first receives metadata about the structure and constraints of the data followed by a stream of raw data blocks from the database. The driver then decodes the received raw data into data items that can be delivered to the user. This step must be done for each value of each row of every column in the result set of a query.

Database drivers for statically typed programming languages such as Java require the user to provide the expected output type when decoding a value. The following code snippet shows an abstract example in Java using the Java Database Connectivity (JDBC) API:

```
ResultSet rs = stmt.executeQuery("SELECT * FROM students WHERE . . .");
rs.next( );
int studentId = rs.getInt(2);
```

In the above example, a query is submitted to a database system through JDBC and a result set handle is returned. With that handle, a user can explore the metadata and fetch data into the user's Java program. When fetching data from a result set, a driver is responsible for getting the raw data of rows from the database systems (e.g. "rs.next( )") and for decoding values into a form that can be represented in Java. In statically typed languages, the specification of how to decode a value is given by the user. For example, the call "rs.getInt(2)" explicitly tells the driver to get the value of the column with index 2 in form of a Java integer.

In contrast, dynamically typed programming languages (e.g., JavaScript, Ruby, Python) do not provide ways to specify the data type that a column of a row should be converted into. Data types are dynamically inferred and verified by the language at runtime. The following code snippet shows how reading a column value might look like in JavaScript:

```
var resultSet = stmt.executeQuery("SELECT * FROM students WHERE . . .");
resultSet.next( );
var studentId = resultSet.get(2);
```

In contrast to statically typed programming languages such as Java where the user provides the expected output type when decoding a value, the type of the "studentId" column in the above code example is decided by the driver at runtime and is typically based on some well-documented default mapping between the database types and the language types. The driver exploits the metadata (e.g. database types, column constraints) provided by the database to automatically decode the received raw bytes into a value of the appropriate type.

The interpretation of metadata to select the correct data decoding method is a performance critical part of a database driver. It typically involves interpretation cost on every retrieval of a column from a result set, e.g., the implementation would have to use lookups at run-time and might look like as follows:

```
function get(var index) {
    if (metadata.getType(index) == dataTypes.NUMBER)
        return metadata.mayBeNull(index) ?
            getDoubleOrNULLFromNumber :
            getDoubleFromNumber(index);
    else if (metadata.getType(index) == dataTypes.
    BINARY_DOUBLE)
        return metadata.mayBeNull(index) ?
            getDoubleOrNULLFromBinaryDouble : getDoubleFrom-
            BinaryDouble(index);
    else if (metadata.getType(index) == dataTypes.VARCHAR)
        return metadata.mayBeNull(index) ? getStringOrNull( ) :
            getString(index);
    else if (metadata.getType(index) == dataTypes.CLOB)
        return metadata.mayBeNull(index) ? getCLOBOrNull(index)
        :
        getCLOB(index);
    else if
        . . .
}
```

As shown in the above code example, when a user requests a value from the driver, the driver performs several lookups to determine the specific function that performs the correct decoding for the value. For example, if the source data type of a requested value is VARCHAR with the constraint NOT NULL, the function get(1) would dispatch to getString(1) that decodes the raw data into a JavaScript string.

The key issue with this approach to decoding for dynamic programming languages is that determining the correct decoding function must be done for every value a user requests, imposing significant overhead as result.

Based on the foregoing, an approach for reducing overhead of decoding operations using dynamically typed languages is desired.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques described herein provide efficient data decoding using runtime specialization.

When a user queries a relational database, a driver first receives metadata about the structure and constraints of the requested data followed by a stream of raw data blocks from the database. The driver then decodes the received raw data into data items that can be delivered to the user.

Dynamically typed programming languages (e.g., JavaScript, Ruby, Python) do not provide ways to specify the data type that a column of a row should be converted into for the user. Instead, datatypes are dynamically inferred and verified by the language at runtime. Typically, when a user requests a value from a driver, a database driver for a dynamically typed programming language performs several lookups to determine a specific function that performs the correct decoding for the requested value. Determining the correct decoding function must be done for every value a user requests from the database.

Instead of performing a function lookup each time a value of a row of a column is accessed, the metadata for each column can be used to generate a decoder, during runtime, for each column that is accessed by a query. A "decoder" as referred to herein is an executable program that performs the translation of formatted data into a different format. The generated decoders may then be automatically in-lined into the program that triggers the decoding operation by a JIT compiler and used each time a row is accessed from a column for which a decoder has been generated. Decoders may be further specialized at runtime based on assumptions drawn from the column metadata.

References to "runtime" in the paper may refer to several instances of runtime. First, the initial generation and use of a decoder occurs at runtime of a user program. Second, each decoder has a creation time at which the decoder is generated and statically specialized/concretized but not yet used. Third, each decoder has its own runtime at which the decoder is used and modified through using runtime specialization.

Using this approach, the overall efficiency of decoding operations for dynamic programming languages may benefit from generating decoders at runtime for each column of a table that is accessed. Whenever a user reads a value of a column for which a decoder has already been generated, the generated decoder is directly invoked instead of performing a computationally expensive function lookup, and overhead is reduced.

System Overview

Figure 1:
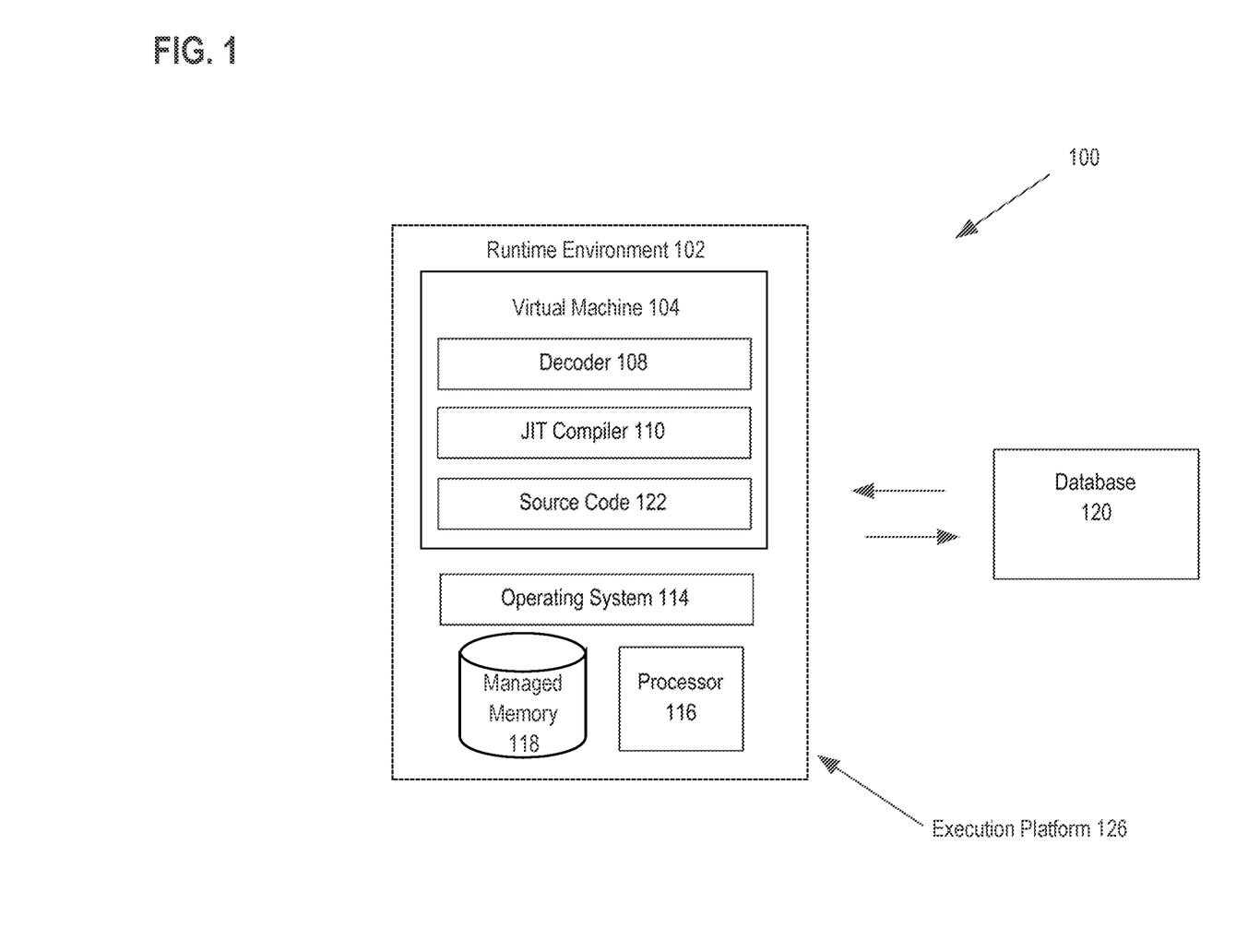
FIG. 1 is a block diagram illustrating an example computing system.

FIG. 1 illustrates an example system 100 in which the described techniques may be practiced, according to an embodiment. FIG. 1 is but one example of a system in which the described techniques may be practiced. Other systems may include fewer or additional elements in varying arrangements.

System 100 comprises an execution platform 126 that includes a runtime environment 102. The runtime environment 102 includes a virtual machine 104 comprising various components, such as a just-in-time (JIT) compiler 110 for producing optimized machine code such as a decoder 108. A "decoder" as referred to herein is an executable program that performs the translation of formatted data into a different format. By way of non-limiting example, runtime environment 102 may be Node.js for executing JavaScript-based applications, or a runtime for executing code written in any other suitable language.

In an embodiment, the computing system 100 includes source code files 122 that contain code that has been written in a particular programming language, such as Java, JavaScript, C, C++, C#, Ruby, Perl, and so forth. Thus, the source code files 122 adhere to a particular set of syntactic and/or semantic rules for the associated language. For example, code written in JavaScript adheres to the JavaScript Language Specification. Source code files 122 or representations thereof may be executed by the execution platform.

In an embodiment, the components or processes of runtime environment 102 are invoked in response to an operating system 114 receiving a request to execute source code 122 that is associated with runtime environment 102. For instance, the operating system 114 may be configured to automatically start executing the runtime environment 102 when receiving requests from database 120 or a client associated with the runtime environment 102. In an embodiment, the runtime environment 102 may be implemented by compiled code that is embedded directly within a file or files that contain program code. In an embodiment, runtime environment 102 may be a set of components or processes that an operating system 114 persistently executes, or may even be the operating system 114 itself.

In an embodiment, runtime environment 102 may be or include a virtual machine 104 configured to interpret program code in a platform independent language, and issue instructions to a processor, such as processor 116, that cause the processor 116 to implement the source code 112 or execute the decoder 108. Runtime environment 102 may therefore compile, translate, or otherwise convert higher-level instructions found in source code 112 into lower-level instructions executable by processor 116 and/or by an intermediate component such as an operating system 114.

In an embodiment, the virtual machine 104 includes at least a dynamic compiler or translator, such as the just-in-time compiler 110. The dynamic compiler translates certain portions of source code 122 to compiled code as the source code 122 is being executed. In some embodiments, the runtime system 102 will begin executing source code 122 by interpreting the source code 122. The dynamic compiler will monitor the execution of source code 122 for portions that are frequently repeated, and generate compiled versions of those portions.

In other embodiments, the just-in-time compiler 110 may be used during runtime to dynamically compile an executable decoder 108. Using techniques described herein, the decoder 108 may be dynamically compiled by the just-in-time compiler 110 and may be optimized to decode data received from the database 120 into an appropriate format to be delivered to a client.

In other embodiments, some or all of source code 122 may be code that is already compiled in a form that is directly executable by a processor 116 or intermediate operating system 114. In an embodiment, processor 116 or an intermediate component such as an operating system 114 allocates a managed memory area 118 for use by the runtime environment 102.

In an embodiment, source code 122 may include commands to query the database 120. The database 122 or a database driver may deliver result sets of data to the execution platform 126 based on the query. A driver in the execution platform 126 may receive metadata describing the structure and constraints of the requested data specified in the query, followed by a stream of raw data blocks. The driver in the execution platform 126 may then decode the received raw data into data items that can be delivered to a client in the appropriate format.

In an embodiment, database 120 includes a relational database that stores data in the form of tables and maintains metadata for each column of a table. In general, metadata includes information about the source data types of the values of each column of a table (e.g., NUMBER, STRING). The metadata may also include information such as: a flag or other information that indicates whether there can be NULL values in a column, a value range of numeric columns, a character set of a textual column, and a statically known size of specific database types.

Dynamically Typed Languages

A dynamic language is a programming language, which, at runtime, can execute many common programming behaviors that statically typed programming languages perform during compilation. These behaviors could include extending the program by adding new code, extending objects and definitions, or by modifying the type system. Some examples of dynamic languages include JavaScript, Python, PHP, and Ruby.

A programming language is dynamically typed if it performs type checking at runtime. Type checking is the process of verifying that a program is type safe. A program is type safe if the arguments of all of its operations are the correct type. Dynamic languages such as JavaScript, Python, PHP, and Ruby verify types at runtime, rather than at compile time, that values in an application conform to expected types. These languages typically do not have any type information available at compile time. The type of an object can be determined only at runtime.

In contrast, a programming language is statically typed if it performs type checking at compile time. Java is a statically typed language. All typed information for class and instance variables, method parameters, return values, and other variables is available when a program is compiled. The compiler for the Java programming language uses this type information to produce strongly typed bytecode, which can then be efficiently executed by the JVM at runtime.

Just in Time Compilation

In general, a compiler is a computer program(s) that transforms source code written in a programming language into binary object codes such as assembly language or machine code. Dynamic languages feature a type of compilation called just in time compilation ("JIT"). Just in time compilation is compilation done during execution of a program—at run time—rather than prior to execution. Most often this consists of translation to machine code, which is then executed directly, but can also refer to translation to another format. A system implementing a JIT compiler typically continuously analyses the code being executed and identifies parts of the code where the speedup gained from compilation would outweigh the overhead of compiling that code.

A JIT compiler offers an API to generate code at runtime. The code generator may be a low-level code generator, such as LLVM, or a more elaborate JIT-compiler, such as the Graal compiler from Oracle, wherein generated code is first described as an abstract syntax tree that is JIT-compiled at run-time. A JIT-compiler can be utilized to generate aggressively specialized code. A JIT-compiler may also be utilized to invalidate and replace specialized code. A JIT-compiler may be utilized to in-line generated decoders into a program that triggers a decoding operation. The capabilities of a JIT-compiler are further described below.

Data Decoder Generator

When a client (e.g., a user program written in a dynamically typed programming language) queries a relational database, a database driver first computes the metadata of the result table and sends it to the client. The metadata for a result table may include information about the source data types of the values of each column of a table (e.g., NUMBER, STRING). The metadata may also include information such as: a flag or other information that indicates whether there can be NULL values in a column, a value range of numeric columns, a character set of a textual column, and a statically known size of specific database types. The client can then request, via the driver, the next row of the result table until all rows of the table are consumed.

For example, consider the code snippet below:

```
var resultSet = stmt.executeQuery("SELECT * FROM students WHERE . . .");
while (rs.hasNext( )) {
  resultSet.next( );
  var studentName = resultSet.get(1);
  var studentId = resultSet.get(2);
  doSomethingUseful(studentName, studentId);
}
```

The code snippet includes a while loop that retrieves values from columns with indexes "1" and "2" of the "students" table. The term "code snippet" referred to herein is defined as a re-usable source code (e.g. a block, set, or sequence of statements written in a computer language) or intermediate code (byte code). This particular example requires numerous column read operations (i.e., the get( ) function calls) for the query. Because of the nature of dynamically typed programming languages, type checking is performed at runtime for each value access.

Thus, in this example, each time the "get( )" function is called, metadata for the referenced column index (e.g. "1" or "2") is accessed by a driver and the driver performs several lookups to determine a specific function that performs the correct decoding for a client.

Instead of performing a lookup each time a value of a row of a column is accessed, the metadata for each column can be used to generate a specialized decoder for each column that is accessed by a query. The generated decoders may then be automatically in-lined into the program that triggers the decoding operation by a JIT compiler and used each time a row is accessed from a column for which a decoder has been generated.

Figure 2:
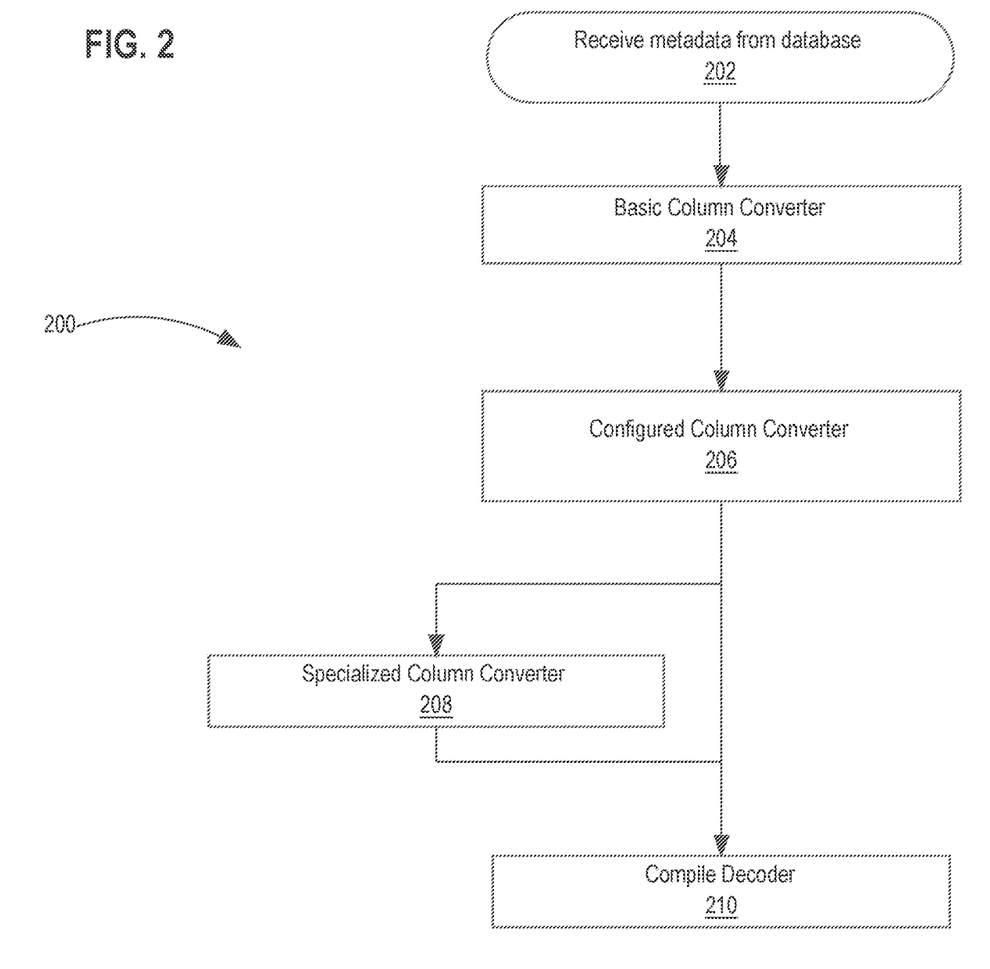
FIG. 2 is a flowchart illustrating the initial generation of a decoder at runtime.

FIG. 2 is a flow chart that illustrates the initial generation of a decoder at runtime. In general, a data decoder generator creates and installs specialized decoding code based on the metadata for a set of values (e.g., a table column). Steps 204-210 are intended to illustrate the generation of pieces of code (e.g. code snippets) that serve as building blocks to compose a final decoder.

In step 202, metadata is received from a database. The metadata may be received in response to a read operation transmitted to the database.

In step 204, a basic column converter code snippet is generated that provides the needed "boiler plate" code for a new decoder being generated at runtime of a user program. In other words, a new decoder gets instantiated.

Figure 3:
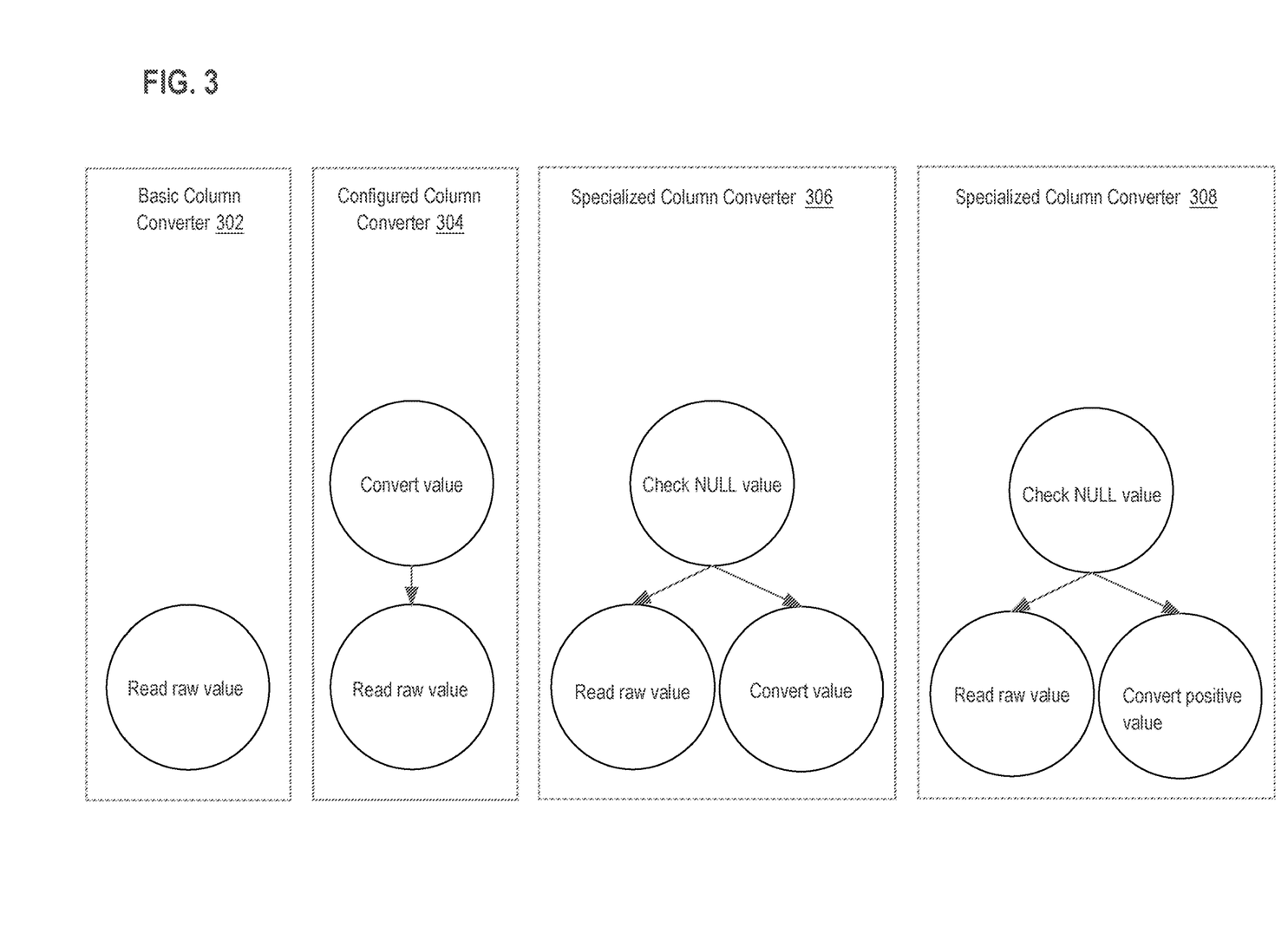
FIG. 3 illustrates the generation and specialization of a decoder at different points in time.

FIG. 3 illustrates the generation and specialization of a decoder at different points in time. The basis column converter 302 is shown in FIG. 3 in form of an Abstract Syntax Tree (AST), which can be used to implement the decoder generation process. A basic column converter 302 consists only of a node for reading a raw value and does not contain any code for doing actual conversions.

In step 206, a configured column converter code snippet is generated based on the metadata received in step 202 and added to the basic column converter code snippet generated in step 204. For example, based on the received metadata, the data type/encoding of the raw data from the database is known (e.g. VARCHAR), as well as the data type/encoding required as output by the client (e.g. JavaScript string). Based on this knowledge, a code snippet is generated that implements the desired decoding from input data type to output data type.

The configured column converter 304 shown in FIG. 3 illustrates step 206 from FIG. 2. For example, in addition to the node for reading a raw value as discussed with respect to the basic column converter 302, a generic conversion node is added to the AST. Generic means that the added conversion code is capable of correctly converting every possible raw input value. During execution time when the generated decoder already is in use, the generic conversion node as well as any other node of the AST can be replaced by a more specialized node based on assumptions made while using the decoder for an extended period of time. For example, the generic conversion node may be replaced by a conversion node that operates faster but can only convert integer values between 0 and 127.

In step 208, a specialized column converter code snippet is generated based on the metadata received in step 202 and added to the configured column converter code snippet generated in step 206. The metadata is analyzed to determine if additional code snippets must be added to further concretize the decoder at creation time. For example, if the metadata does not contain any information regarding potential NULL values of a column (e.g. the column is NULLable), a code snippet must be added that implements a check that tests each input value for NULL and handles them accordingly. However, if the metadata states that there cannot be NULL values for a column (e.g. the column is not NULLable), the NULL handling is omitted from the decoder.

The specialized column converter 306 shown in FIG. 3 illustrates step 208 from FIG. 2. For example, the specialized column converter 306 depicts a case where a check for NULL values is needed. In addition to the node for reading a raw value as discussed with respect to the basic column converter 302 and the generic conversion node as discussed with respect to the configured column converter 304, a check NULL value node is added to the AST. The check NULL value node first uses the read raw value node to read a raw value and checks if the raw value is a NULL value. If the raw value is not a NULL value, the generic conversion node is used to create the output value. Otherwise, the NULL value is reported as the output value without performing a conversion.

Other specializations may be added via speculations on assumptions that can be invalidated in mid-flight (i.e., during runtime). For example, the metadata might indicate that a column contains numbers but does not specify a value range. In this case, a code snippet can be generated that is capable of decoding any value with number type. However, when the generated decoder already has been used for some time, an additional assumption can be made that all numbers of a specific table column are positive integers because all values processed so far fulfill that assumption. In this case, a code snippet is generated that specializes in decoding positive integers for the specific table column, further optimizing the decoding operation.

In such a case, any previously generated decoder for the specific table column is replaced by a new decoder that only can decode positive integer numbers. If the speculative assumptions are true for each row value access, the new, specialized decoder can be used to achieve a higher performance. The specialized column converter 308 shown in FIG. 3 illustrates such a case. For example, based on true speculative assumptions as discussed above, the generic conversion node, as discussed with respect to the specialized column converter 306, is replaced by a specialized conversion node for positive integers during runtime.

However, when a value is accessed that violates the speculative assumptions embedded in the decoder (e.g. a value is accessed that is not a positive integer), the new specialized decoder is invalidated and a new decoder is generated and utilized that is not based on the invalidated speculative assumptions. For the generated decoder, the conversion node gets replaced again by another specialized, but less aggressive, conversion node or is reverted back to the generic conversion node, such as illustrated in the specialized column converter 306.

The de-optimization capability of a speculative JIT-compiler (such as the Graal JIT-compiler from Oracle) can be utilized to generate aggressively specialized code. For example, a decoder may be generated based on assumptions that might not hold true for each row of a column (e.g., "all numeric values of a column are positive"). As soon as such an assumption becomes invalid, a speculative JIT-compiler provides the capability to invalidate and replace the aggressively specialized code with code that is not based on the invalid assumptions.

For example, following invalidation of a first version of decoding machine code, a second version of decoding machine code is generated that guarantees that the assumption that was violated is removed to avoid invalidation because of the assumption. For example, if a first version of decoding machine code was generated to decode positive number values between 0 and 99, a value of 111 would invalidate the assumption that all number values being decoded are between 0 and 99. The second version of decoding machine code would be modified to decode positive value between 0 and 999, so that if the database sends a value of 111, the assumption for the second version of decoding machine code will not be invalidated.

The new generated code may also be totally generic, i.e., to cover the whole range of number (e.g., if too many different values need to be handled for example).

In step 210, a decoder is compiled based on the code snippets generated in steps 204-208. The code snippets generated by steps 204-208 are compiled into machine code. The decoder may be compiled by a JIT compiler during runtime.

Thus, by exploiting metadata received from a database, decoders can be generated and utilized during runtime that can be used to decode an entire dataset, because the underlying assumptions (e.g., a column has the data type NUMBER and no NULL values) cannot change.

Example Process

Figure 4:
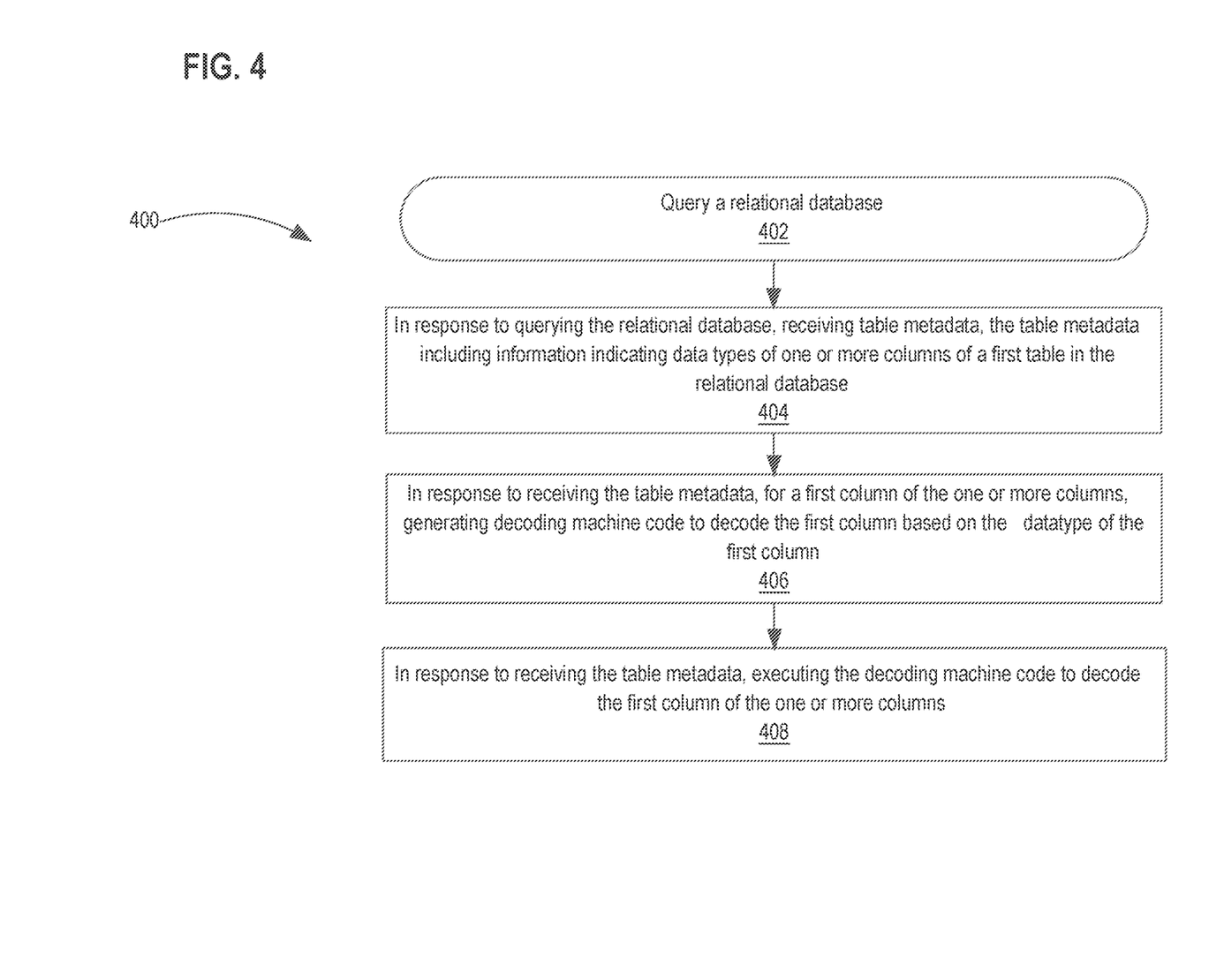
FIG. 4 is a flowchart illustrating steps for efficient data decoding using runtime specialization.

FIG. 4 shows an example process flow 400 for efficient data decoding using runtime specialization. Flow 400 is one example of a flow for efficient data decoding using runtime specialization. Other flows may comprise fewer or additional elements, in varying arrangements.

In an embodiment, flow 400 is performed by a virtual machine that is part of a runtime environment as discussed in FIG. 1. In an embodiment, a body of code of a dynamically typed language is executed, wherein executing said body of code includes the following steps of flow 400:

In step 402, a relational database is queried. The query may include a table access.

In step 404, in response to querying the relational database, table metadata is received. The table metadata includes information indicating data types of one or more columns of a table in the relational database. In an embodiment, the table metadata includes information such as: a flag to indicate whether there can be NULL values in a column, the value range of numeric columns, the character set of a textual column, and the statically known size of specific database types.

In step 406, in response to receiving the table metadata, for a first column of the one or more columns, decoding machine code is generated to decode the first column based on the data type of the first column. As discussed above with respect to FIG. 2, decoding machine code is generated at runtime based on the received table metadata.

In step 408, in response to receiving the table metadata, the decoding machine code is executed to decode the first column of the one or more columns. In an embodiment, the decoding machine code is in-lined into a program that triggers the decoding operation. For example, the dynamically typed language, e.g., JavaScript, in-lines all calls to a data decoding such that the decoder generation occurs on the first access of a value of a column and does not require any overhead on subsequent accesses of values of the column. Additionally, as discussed above with respect to FIG. 2, decoding machine code is executed at runtime.

Thus, for each specific configuration of data type and constraints specified by the table metadata, a decoder is generated on demand, installed for the column that has triggered its creation, and cached in memory for future decoding operations of other columns with the same configuration. Whenever a user reads a value of a column for which a decoder has already been generated, the installed decoder is directly invoked without using any kind of dispatching mechanism.

In an embodiment, the generated decoding machine code may be shared across equal columns (i.e., columns that have the same data type and constraints) of the same or a different result set. For example, decoding machine code generated for a specific column can be used to decode a column that has the same datatype as the specific column. Additionally, decoding machine code generated for a specific column can be used to decode a column from a different table of the same or different relational database that has the same datatype as the specific column.

Using techniques discussed by flow 400, the overall efficiency of decoding operations for dynamic programming languages may benefit. Whenever a user reads a value of a column for which a decoder has already been generated, the generated decoder is directly invoked instead of performing a computationally expensive function lookup. Without generating decoders for each column, the metadata for each row and each column must be processed in order to decide how to decode the data in dynamically typed programming languages. Thus, techniques discussed by flow 400 improve processing overhead by reducing computation time, memory usage, and bandwidth required to perform decoding operations.

Software Overview

Figure 5:
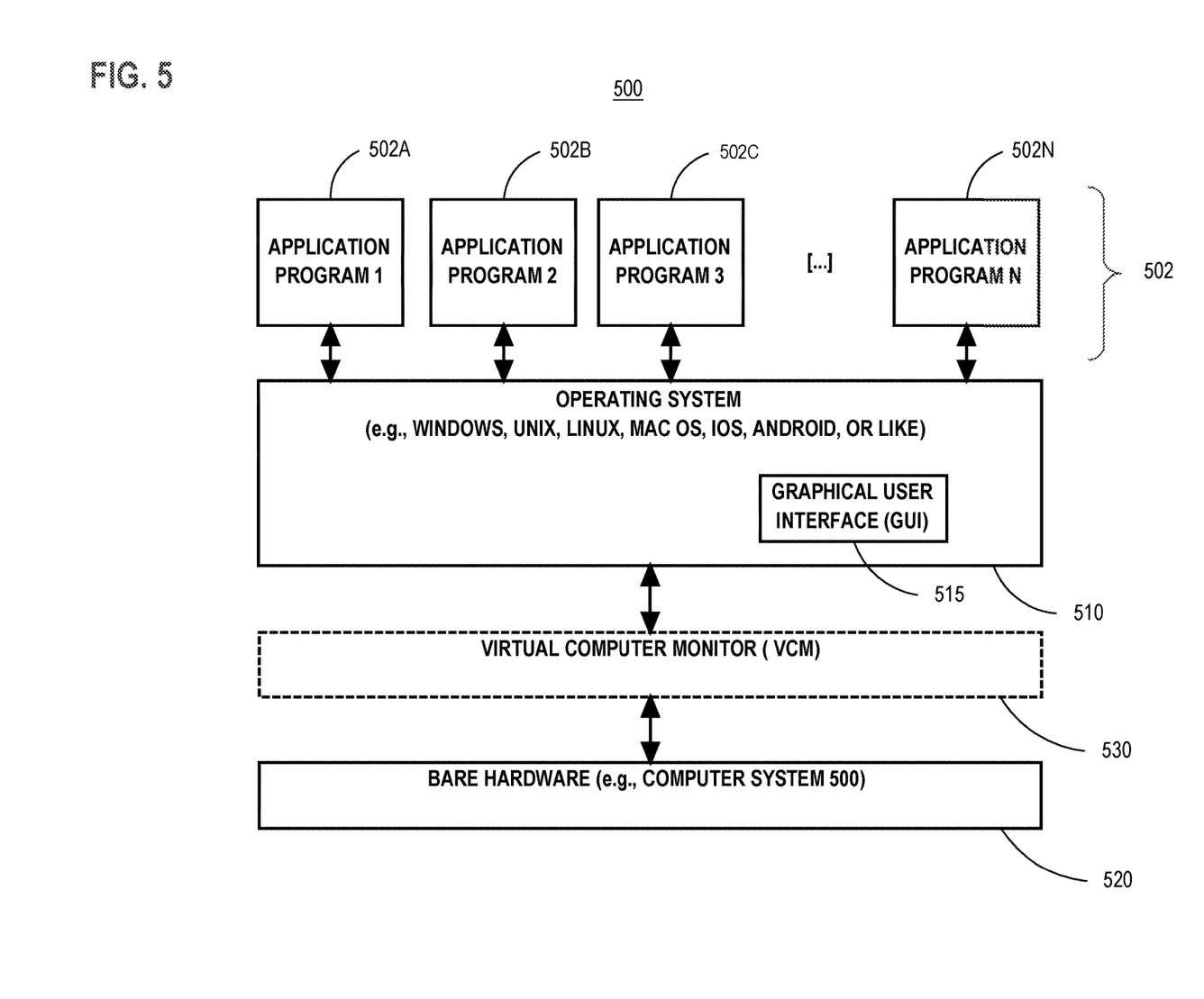
FIG. 5 is a block diagram of a basic software system that may be employed for controlling the operation of computing system 600.
Figure 6:
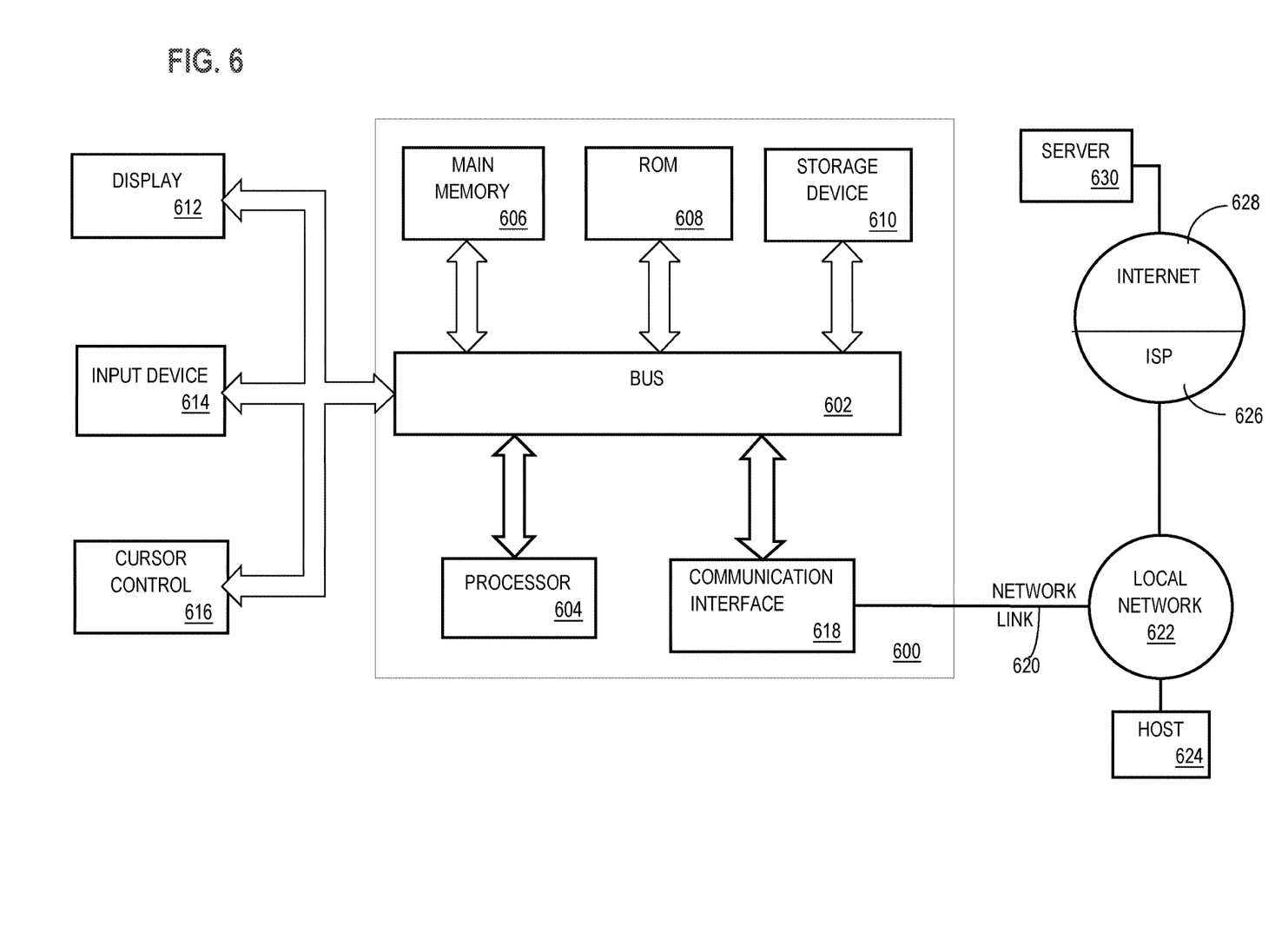
FIG. 6 depicts a computer system upon which an embodiment may be implemented.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual computer monitor (VCM) 530 may be interposed between the bare hardware 520 and the OS 510. In this configuration, VCM 530 acts as a software "cushion" or virtualization layer between the OS 510 and the bare hardware 520 of the computer system 600.

VCM 530 instantiates and runs one or more virtual machine instances ("guest machines"). Each guest machine comprises a "guest" operating system, such as OS 510, and one or more applications, such as application(s) 502, designed to execute on the guest operating system. The VCM 530 presents the guest operating systems with a virtual operating platform and manages the execution of the guest operating systems.

In some instances, the VCM 530 may allow a guest operating system to run as if it is running on the bare hardware 520 of computer system 600 directly. In these instances, the same version of the guest operating system configured to execute on the bare hardware 520 directly may also execute on VCM 530 without modification or reconfiguration. In other words, VCM 530 may provide full hardware and CPU virtualization to a guest operating system in some instances.

In other instances, a guest operating system may be specially designed or configured to execute on VCM 530 for efficiency. In these instances, the guest operating system is "aware" that it executes on a virtual machine monitor. In other words, VCM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A method comprising:
   executing a body of code of a dynamically typed language, wherein executing said body of code includes:
   querying against a relational database;
   in response to the query, receiving table metadata, the table metadata indicating data types of one or more columns of a first table in the relational database;
   in response to receiving the table metadata:
   for a first column of the one or more columns, a Just-In-Time (JIT) compiler generating decoding machine code to decode said first column based on a data type of said first column that is indicated by said table metadata;
   executing said decoding machine code to decode said first column of said one or more columns;
   in response to executing said decoding machine code to decode said first column of said one or more columns:

identifying a value of the first column that violates an assumption that is about the values in the first column and is embedded in said decoding machine code;

invalidating said decoding machine code;

generating new decoding machine code to decode said first column that is not based on the assumption;

wherein the method is performed by one or more computing devices.

2. The method of claim 1, wherein said body of code is executed by a virtual machine.

3. The method of claim 1, wherein said decoding machine code is generated and executed during runtime.

4. The method of claim 1, wherein the table metadata includes information indicating whether there can be NULL values in a column, a value range of a column, a character set of a column, and a statically known size of database types.

5. The method of claim 1, wherein the table metadata includes information indicating whether there can be NULL values in a column;

wherein generating decoding machine code to decode said first column is based on the data type of said first column and the information indicating whether there can be NULL values in said first column.

6. The method of claim 1, further comprising: executing said decoding machine code to decode a second column of said one or more columns, wherein the second column has the same data type as the first column.

7. The method of claim 1, further comprising: executing said decoding machine code to decode a column of a second table in the relational database.

8. The method of claim 1, wherein said decoding machine code is in-lined into the body of code of the dynamically typed language.

9. One or more non-transitory computer-readable storage media storing instructions that, when executed by one or more processors, cause:

executing a body of code of a dynamically typed language, wherein executing said body of code includes:

querying against a relational database;

in response to the query, receiving table metadata, the table metadata indicating data types of one or more columns of a first table in the relational database;

in response to receiving the table metadata:

for a first column of the one or more columns, a Just-In-Time (JIT) compiler generating decoding machine code to decode said first column based on a data type of said first column that is indicated by said table metadata;

executing said decoding machine code to decode said first column of said one or more columns;

in response to executing said decoding machine code to decode said first column of said one or more columns:

identifying a value of the first column that violates an assumption that is about the values in the first column and is embedded in said decoding machine code;

invalidating said decoding machine code;

generating new decoding machine code to decode said first column that is not based on the assumption.

10. The non-transitory computer-readable storage media of claim 9, wherein said body of code is executed by a virtual machine.

11. The non-transitory computer-readable storage media of claim 9, wherein said decoding machine code is generated and executed during runtime.

12. The non-transitory computer-readable storage media of claim 9, wherein the table metadata includes information indicating whether there can be NULL values in a column, a value range of a column, a character set of a column, and a statically known size of database types.

13. The non-transitory computer-readable storage media of claim 9, wherein the table metadata includes information indicating whether there can be NULL values in a column;

wherein generating decoding machine code to decode said first column is based on the data type of said first column and the information indicating whether there can be NULL values in said first column.

14. The non-transitory computer-readable storage media of claim 9, the instructions including instructions that, when executed by said one or more processors, cause executing said decoding machine code to decode a second column of said one or more columns, wherein the second column has the same data type as the first column.

15. The non-transitory computer-readable storage media of claim 9, the instructions including instructions that, when executed by said one or more processors, cause executing said decoding machine code to decode a column of a second table in the relational database.

16. The non-transitory computer-readable storage media of claim 9, wherein said decoding machine code is in-lined into the body of code of the dynamically typed language.

\* \* \* \* \*

UNITED STATES PATENT AND TRADEMARK OFFICE
CERTIFICATE OF CORRECTION

PATENT NO. : 10,684,873 B2
APPLICATION NO. : 16/006668
DATED : June 16, 2020
INVENTOR(S) : Hossbach et al.

Page 1 of 1

It is certified that error appears in the above-identified patent and that said Letters Patent is hereby corrected as shown below:

On the Title Page

On page 2, Column 2, item [56], Line 7, delete "JITbased" and insert -- JIT based --, therefor.

In the Claims

Column 16, Line 36, Claim 14, delete "execusted" and insert -- executed --, therefor.

Column 16, Line 42, Claim 15, delete "execusted" and insert -- executed --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*